United States Patent
Nolan (10) Patent No.: US 11,765,208 B2
(45) Date of Patent: Sep. 19, 2023

(54) SYSTEMS AND METHODS FOR DYNAMIC CONNECTION MANAGEMENT

(71) Applicant: COMCAST CABLE COMMUNICATIONS, LLC, Philadelphia, PA (US)

(72) Inventor: Eugene Nolan, Maple Glen, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 49 days.

(21) Appl. No.: 14/153,571

(22) Filed: Jan. 13, 2014

(65) Prior Publication Data

US 2015/0200973 A1 Jul. 16, 2015

(51) Int. Cl.
| H04L 65/1069 | (2022.01) |
| H04L 67/141 | (2022.01) |
| H04L 65/1073 | (2022.01) |
| H04L 65/1104 | (2022.01) |
| H04L 67/54 | (2022.01) |

(52) U.S. Cl.
CPC ...... *H04L 65/1069* (2013.01); *H04L 65/1073* (2013.01); *H04L 65/1104* (2022.05); *H04L 67/141* (2013.01); *H04L 67/54* (2022.05)

(58) Field of Classification Search
CPC ............. H04L 65/1006; H04L 65/1069; H04L 65/1073; H04L 65/4084; H04L 67/10; H04L 67/1063; H04L 65/105; H04L 12/66; H04L 67/14; H04L 67/142; H04L 67/145; H04L 67/24; H04L 65/1104; H04L 67/141; H04L 67/54; H04W 80/10
See application file for complete search history.

(56) References Cited

U.S. PATENT DOCUMENTS

| 8,312,092 | B2 * | 11/2012 | Rogers | H04L 12/66 709/203 |
| 8,738,715 | B2 * | 5/2014 | Roy | G06Q 10/107 709/206 |
| 8,819,111 | B2 * | 8/2014 | Langer | H04L 51/04 379/265.09 |
| 10,320,854 | B1 * | 6/2019 | Jones | H04L 65/1093 |
| 2004/0252683 | A1 * | 12/2004 | Kennedy | H04L 29/06 370/389 |
| 2005/0041578 | A1 * | 2/2005 | Huotari | H04L 65/762 370/229 |
| 2006/0148477 | A1 * | 7/2006 | Reilly | H04L 67/24 455/436 |
| 2011/0107379 | A1 * | 5/2011 | Lajoie | H04L 65/1016 725/87 |

(Continued)

*Primary Examiner* — Glenton B Burgess
*Assistant Examiner* — Rachel J Hackenberg
(74) *Attorney, Agent, or Firm* — Ballard Spahr LLP (57) ABSTRACT

Provided are methods and systems for dynamic connection management. The method can comprise establishing a persistent connection with a web service, receiving a notification of a request for a communication session with a computing device via the web service, registering with a communication processing system to receive the request for the communication session, and establishing the communication session with the computing device via the communication processing system. When the communication session ends, the user device can be deregistered and free up the resources on the computing device.

24 Claims, 6 Drawing Sheets

(56) References Cited

U.S. PATENT DOCUMENTS

| | | | | |
|---|---|---|---|---|
| 2012/0179829 A1* | 7/2012 | George | ............... | H04L 65/1069 |
| | | | | 709/227 |
| 2012/0303831 A1* | 11/2012 | Toshniwal | .......... | H04L 65/1069 |
| | | | | 709/229 |
| 2013/0013704 A1* | 1/2013 | Pope | ................... | H04L 61/1541 |
| | | | | 709/206 |
| 2014/0006494 A1* | 1/2014 | George | ................. | G06Q 50/01 |
| | | | | 709/204 |
| 2015/0043429 A1* | 2/2015 | Kim | ........................ | H04L 67/18 |
| | | | | 370/328 |

\* cited by examiner

SYSTEMS AND METHODS FOR DYNAMIC CONNECTION MANAGEMENT

BACKGROUND

In systems utilizing a remote/host relationship, remote devices rely on a host to provide services. In order to receive services from the host, a remote device must be registered with the host. However, persistent long-term registration of the remote device with the host can tie up valuable host resources. The speed of response of the host to the remote device can decrease as a result. In some instances, additional hosts are needed to satisfy the number of registered remote devices. Increasing the number of hosts increases the cost of a remote/host network infrastructure. For these and other types of systems and networks, more efficient connection management mechanisms are needed.

SUMMARY

It is to be understood that both the following general description and the following detailed description are exemplary and explanatory only and are not restrictive, as claimed. Provided are methods and systems for dynamic connection management. An example method can comprise establishing a persistent connection with a network service, such as web service, receiving a notification of a request for communication (e.g., communication session) with a computing device via the network service, registering with a communication processing system to receive the request for the communication session, and establishing the communication session with the computing device via the communication processing system.

In an aspect, an example method can comprise establishing a persistent connection with a user device, engaging (e.g., subscribing to) a presence system on behalf of the user device, receiving a request for a communication session from a computing device via the presence system, and notifying the user device of the request for the communication session.

In another aspect, an example method can comprise receiving a request for communication session from a first user device, notifying a second user device of the request for a communication by notifying a web service (or any network service) in communication with the second user device, registering the second user device through a communication processing system, and establishing the communication session between the first user device and the second user device upon registration of the second user device.

In another aspect, an example system can comprise a computing device, a presence system, a service (e.g., web service) and a communication processing system. The computing device can be configured for receiving an incoming request for a communication session and publishing the communication session request to a presence system. The presence system can be configured for notifying a service (e.g., web service) of the request for the communication session. The service (e.g., web service) can be configured for establishing a persistent connection with a user device, engaging (e.g., subscribing to) the presence system on behalf of the user device, and notifying the user device of the request for the communication session. The communication processing system can be configured for registering the user device and establishing the communication session. The disclosed systems and methods can be used for communication sessions, interact telephone calls (e.g., VoIP), multimedia access and distribution, and multimedia conferences and presentations.

The systems and methods for dynamic registration and connection management disclosed herein allow a device such as a user device to establish a connection with a computing device only when a communication session is requested. An agent can be utilized between the user device and the computing device. As an example, the agent can be a service (e.g., web service) and a presence system. When the user device is notified of a present event (e.g., a communication session request for the user device), the user device can register with the computing device through the communication processing system and start to process the present event start of a communication session). When the present event is processed by the user device (e.g., the communication session is over), registration between the user device and the computing device can be disabled, if desired.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for ex other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
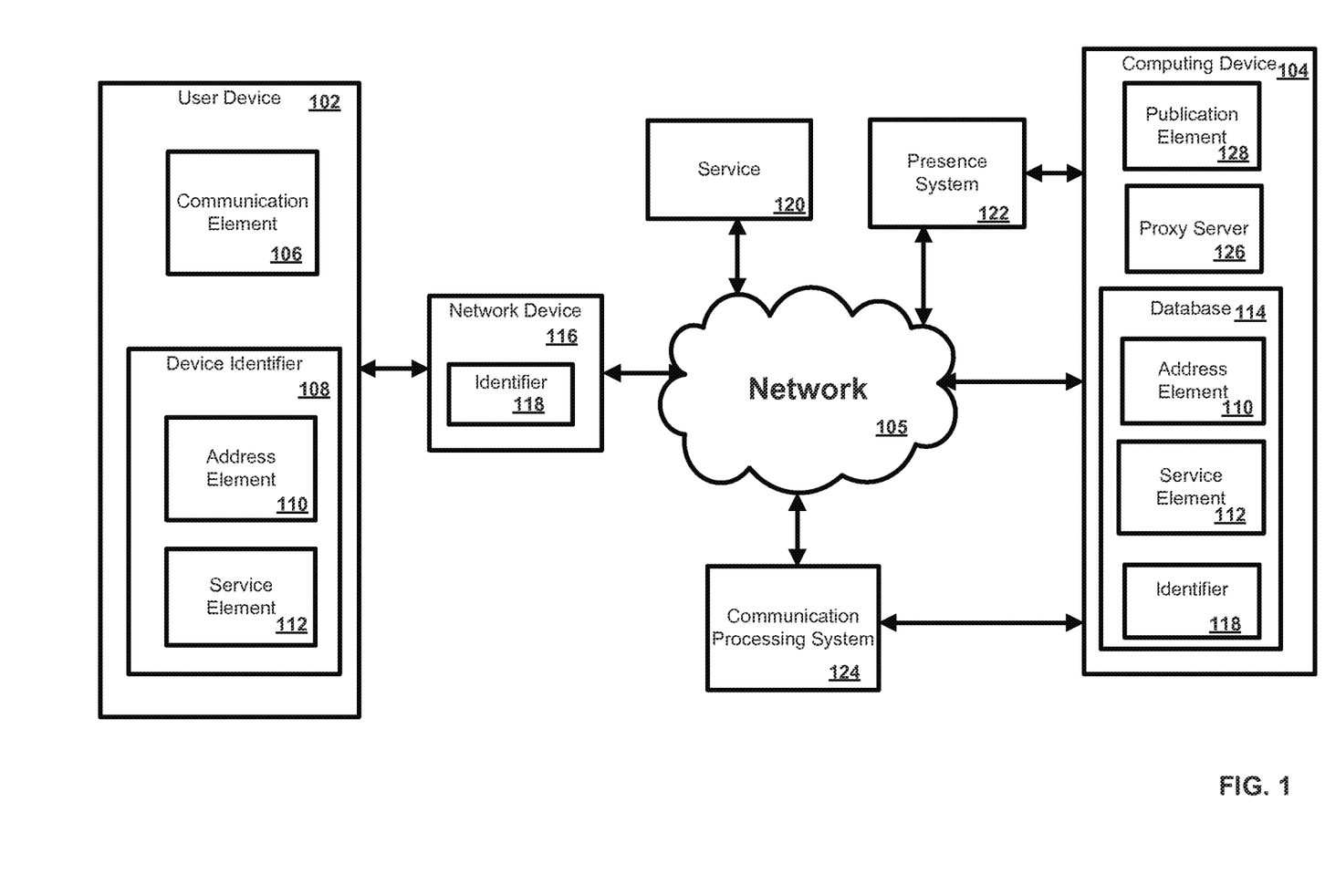
FIG. 1 is a block diagram of an exemplary system.

FIG. 1 illustrates various aspects of an exemplary environment in which the present methods and systems can operate. The present disclosure is relevant to systems and methods for dynamic registration of a user device, such as a telephone, a VoIP Phone, a software client, a computer, a tablet, a mobile device, a communications terminal, or the like. In one aspect of the disclosure, a system can be configured to provide services, such as network-related services to a user device. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise user device 102 in communication with a computing device 104, such as a server. The computing device 104 can be disposed locally or remotely relative to the user device 102. As an example, the user device 102 and the computing device 104 can be in communication via a private and/or public network 105, such as the Internet or a local area network. Other forms of communications can be used, such as wired and wireless telecommunication channels, for example, 1X, 3G, 4G, 4G LTE network.

In an aspect, the user device 102 can be an electronic device, such as a computer, a telephone, a VoIP phone, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface, such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files and/or services from a local source and/or a remote source. As a further example, the communication element 106 can transmit data to a local or remote device, such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108. As an example, the user device 102 can be notified of a request for communication session by its device identifier 108.

In an aspect, the device identifier 108 can comprise an address element 110 and a service element 112. In an aspect, the address element 110 can comprise or provide an internet protocol address, a network address, a media access control (MAC) address, an Internet address, a telephone number, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network. As an example, the user device 102 can be notified of a request for communication session by its address element 110.

In an aspect, the service element 112 can associate the device identifier 108 and/or address element 110 with a user and/or telephone numbers linked with the user. As an example, the user can be identified by user name, user account, and the like. As such, when the computing device 104 receives a request for a communication session with a user or telephone numbers linked with the user, some or all the user devices associated with the user or telephone numbers linked with the user can be notified simultaneously.

The service element 112 can comprise an identification of a service provider associated with the user device 102 and/or with the class of user device 102. The class of the user device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. In an aspect, the address element 110 can be used to identify or retrieve data from the service element 112, or vise versa. As a further example, one or more of the address element 110 and the service element 112 can be stored remotely from the user device 102 and retrieved by one or more devices, such as the user device 102 and the computing device 104. Other information can be represented by the service element 112.

In an aspect, the computing device 104 can be a server for communicating with the user device 102. As an example, the computing device 104 can communicate with the user device 102 for providing data and/or services. As an example, the computing device 104 can provide services, such as voice communications, network (e.g., Internet) connectivity, network printing, media management (e.g., media server), content services, streaming services, broadband services, or other network-related services. In an aspect, the computing device 104 can allow the user device 102 to interact with remote resources, such as data, devices and files. For example, the computing device 104 can receive an incoming communication request from a user device on another network capable of communicating with the computing device 104. As an example, the computing device can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system.

In an aspect, the computing device 104 can manage communication between the user device 102 and one or time other user devices (not shown). In an aspect, the one or more other user devices can be the same type of device as the user device 102, such as a computer, a telephone, a VoIP phone, smartphone, a laptop, a tablet, a mobile device, or other device capable of communicating with the computing device 104.

In an aspect, the computing device 104 can manage the communication between the user device 102 and a database 114 for sending and receiving data therebetween. As an example, the database 114 can store a plurality of files (e.g., web pages), user identifiers or records, or other information. As a further example, the user device 102 can request and/or retrieve a file from the database 114. In an aspect, the database 114 can store information relating to the user device 102, such as the address element 110 and/or the service element 112. As an example, the computing device 104 can obtain the device identifier 108 from the user device 102 and retrieve information from the database 114, such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, a network device 116 can facilitate the connection of a device, such as user device 102, to the network 105. As an example, the network devices 116 can be configured as a wireless access point (WAP). In an aspect, the network devices 116 can be configured to allow one or more wireless devices to connect to a wired and/or wireless network using Bluetooth or any desired method or standard.

The network devices 116 can be configured as a local area network (LAN). As an example, one or more network devices 116 can comprise a dual band wireless access point. As an example, the network device 116 can be configured with a first service set identifier (SSID) (e.g., associated with a user network or private network) to function as a local network for a particular user or users. As a further example, the network device 116 can be configured with a second service set identifier (SSID) (e.g., associated with a public/community network or a hidden network) to function as a secondary network or redundant network for connected communication devices.

The network device 116 can comprise an identifier 118. As an example, one or more identifiers can be or relate to an Internet Protocol (IP) Address IPV4/IPV6 or a media access control address (MAC address) or the like. As a further example, identifier 118 can be a unique identifier for facilitating communications on the physical network segment. In an aspect, each of the network devices 116 can comprise a distinct identifier 118. As an example, the identifiers 118 can be associated with a physical location of the network devices 116.

In an aspect, the user device 102 can access the service 120 through a communication element 106. For example, the communication element 106 can provide an interface to a user to interact with the user device 102 and/or the computing device 104. In an aspect, the service 120 can be a web application located and invoked across the web. A service can interact with other applications or another service. The service 120 can communicate with the user device 102 synchronously or asynchronously over standard Internet protocols, such as hypertext transfer protocol (HTTP), simple object access protocol (SOAP), universal description, discovery and integration (UDDI), etc. In an aspect, the service can be a Comet service. In another aspect, the service can be Google cloud messaging service, Cloud 2 device messaging service, Apple push notification service, and the like. As such, a respective presence system for the Google cloud messaging service, Cloud 2 device messaging service, or Apple push notification service can be used for notifying the respective service for a request for a communication session.

In an aspect, the service 120 can engage (e.g., subscribe to) the presence system 122. The presence system 122 can accept, store, and distribute a present event to its engagers (e.g., subscribers), for instance, the service 120. In an aspect, a present event can refer to a communication session request to/from other user devices over network 105. A variety of different indicators can be associated with a present event, such as user device identities, locations, device capabilities, etc. A subscription can refer to a manner in which the presence system 122 can establish its interest in obtaining notification messages relating to particular present events. In an aspect, such events can relate to information associated with the request for communication session for the user device 102. In another aspect, the presence system 122 can be implemented as a server or have an internal structure involving a plurality of servers and proxies. The presence system 122 can also be implemented as direct communicator between computing device 104 and its engagers (e.g., subscribers), for example, the service 120.

In an aspect, the computing device 104 and the presence system 122 can be implemented as separate network entities or reside in a common location. In the latter case, the communication between present system 122 and computing device 104 can be performed by way of internal functionality. For example, the communication can be made by sending internal messages, communicating via a communication protocol between devices through direct links, etc. As an example, the computing device 104 can include a publication element 128 to create the appropriate publication message upon receiving a communication session request. The publication message can be provided to presence system 122 as a present event by proxy server(s) 126 in computing device 104. The presence system 122 can notify the present event to service 120. The service 120 can then notify the present event to the user device 102.

Upon receiving a notification of a request for a communication session with computing device 104 via the service 120, user device 102 can register with a communication processing system 124 to receive the request for the communication session. In an aspect, network 105 can exploit a messaging protocol that enables communication between device 102 and computing device 104 through at least one network node or other functional element within network 105. The messaging protocol can include one or more of various session control protocols for communication, for example, session initiation protocol (SIP), media gateway control protocol (MGCP), real-time transport protocol (RTP), session description protocol, one or more of the of protocols of the H.323 standard, or the like. For example, user device 102 can register with the communication processing system 124 using SIP. In an aspect, the registration enables user devices 102 to establish the communication session with the computing device 104 from a remote location. In another aspect, the registration can allow user devices 102 to determine whether to engage in the communication session. Once a user device is registered, contact information (e.g., address element 110, device identifier 108) of the user device 102 can be stored in database 114 of the computing device 104. As an example, proxy server(s) 126 can provide a link between the communication session requestor and the contact information stored in the database 114 so that proxy server(s) 126 can relay the SIP INVITE to the correct user device. In an aspect, proxy server(s) 126 and database 114 can be closely integrated.

As a specific example, user device 102 can send a SIP registration request to computing device 104 through the communication processing system 124 and the request can be relayed to computing device 104. The SIP proxy server(s) 126 can accept registration request from user device 102 and create a dynamic record of the contact information of the user device 102. The computing device 104 can send SIP INVITE to the user device 102. The user device 102 can engage in a communication session with the computing device 104 by accepting SIP INVITE. In another aspect, the computing device 104 can terminate a communication session in the event that user device 102 does not respond to SIP INVITE. After the communication session is ended, the user device 102 can deregister with the user device 104. As such, the user device 102 can return to the deregistered state until willing to engage in the next communication session with the computing device 104. It should be noted that the specific example discussed utilize SIP exchanges, other types of messages and/or techniques to register device can be used.

In another aspect, a communication processing system 124 deployed between user device 102 and computing device 104 can be used to register the user device 102. The communication processing system 124 can serve as an edge server between user device 102 and computing device 104 to register user device 102. For example, the communication processing system 124 can comprise one or more communication protocol servers. As another example, the communication processing system 124 can comprise a telephone communication processing system. The communication processing system 124 can operate as a server (a proxy server, a communication management server, an application server, etc.), a gateway node (a session border controller (SBC), a media gateway control function ((MGCF), etc.), or a data management unit (e.g., an intelligent routing database (IRDB)). In an aspect, communication processing system 124 can be on the border between a communication service provider and its user devices (e.g., provide a user network interface (UNI)). In another aspect, the communication processing system 124 can be on the border between two communication service providers (e.g., provide network-to-network interface (NNI)). As an example, when a communication session requestor (e.g., first user device) and the user devices being requested for a communication session (e.g., second user device) use different communication service providers, the communication processing system 124 can be employed for NNI. In another aspect, in an IP-multimedia subsystem (IMS) networks, the communication processing system 124 can provide call session control and border gateway functions at UNI and NNI points. In another aspect, the communication processing system 124 can also be used to perform a topology-hiding function to prevent user devices or other communication service providers from learning details about how the network is configured or how communications placed through the network are routed.

The computing device 104 can be used to establish of mutually acceptable administrative procedures between different networks. Some examples of network and system include public switched telephone network (PSTN) system, public land mobile network (PLMN) systems, wireless distribution systems, wireless distribution systems, wired or cable distribution systems, coaxial cable distribution systems, ultra high frequency (UHF) or very high frequency (VHF) radio frequency systems, satellite or other extraterrestrial systems, cellular distribution systems, power-line broadcast systems, fiber optic networks, and any combinations of these systems and/or networks. Accordingly, the computing device 104 can comprise devices, such as protocol translators, impedance matching devices, rate converters, fault isolators, or signal translators as necessary to provide system interoperability.

It should be noted the present disclosure can be applicable in any network environment employing a computing device, a server, a user device or other network entity that is involved in the management of sessions between devices on the network. In order to facilitate an understanding of the disclosure, particular examples of network environments are described herein. However, the present disclosure is not limited thereto and is equally applicable to other analogous network environments as will be readily apparent to those skilled in the art from the description provided herein.

Figure 2:
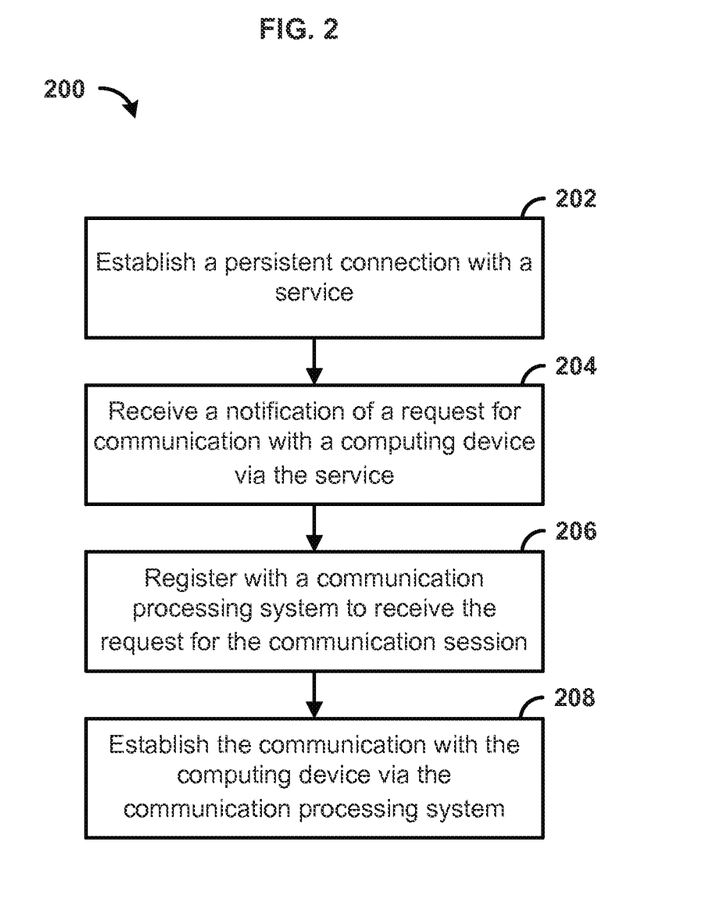
FIG. 2 is a flowchart illustrating an example method.

FIG. 2 is a flow chart illustrating an example method 200 for dynamic connection management. At step 202, a persistent connection with a service can be established. For example, the user device 102 can log in to a service 120 by presenting an authentication credential. In an aspect; the persistent connection can be for a predefined time (e.g., X number of minutes or hours). A service can be, for example, a web application located and invoked across the web. A service can interact with other applications or another service. The service can communicate with the user device 102 synchronously or asynchronously over standard Internet protocols, such as hypertext transfer protocol (HTTP), simple object access protocol (SOAP), universal description, discovery and integration (UDDI), etc. As a specific example, the service can be a Comet service. As a further example, the persistent connection can comprise an expiration date and/or time range (e.g., X number of hours or days). As another example, the service can be Google cloud messaging service, Cloud 2 device messaging service, Apple push notification service, and the like. As such, a respective presence system for the Google cloud messaging service, Cloud 2 device messaging service, or Apple push notification service can be used for notifying the respective service for a request for a communication session. In an aspect, user device 102 can connect to service 120 via a network connection, file transfer protocol (FTP), hypertext transfer protocol (HTTP), hypertext transfer protocol secure (HTTPS), transmission control protocol/internet protocol (TCP/IP) sockets FTP, or any other appropriate data transport mechanism. The user device can be, for example, a computer, a telephone, a VoIP phone, a smartphone, a laptop, a tablet, a mobile device, or the like. In another aspect, the request can be sent by remote authentication dial in user service (RADIUS), terminal access controller access-control system (TACACS), diameter protocol, extensible authentication protocol (EAP), Kerberos protocol, HTTP, blocks extensible exchange protocol (BEEP), or any other appropriate protocol. In another aspect, the service 120 can accept a login credential and thereby establish a persistent user device-service connection. As an example, the service 120 can be a Comet service. When the user device-service connection is established, a Comet application on user device 102 can make a request (e.g., polling) to the Comet service, and the request is kept open until the Comet service has a present event to send to the user device 102. As another example, the service can be Google cloud messaging service, Cloud 2 device messaging service, Apple push notification service, and the like. As such, a respective presence system for the Google cloud messaging service, Cloud 2 device messaging service, or Apple push notification service can be used for notifying the respective service (e.g., web service) for a request for a communication session.

At step 204, a notification of a request for a communication session with a computing device can be received via the service. For example, the service 120 can receive a request for a communication session from a computing device 104. In an aspect, the computing device 104 can receive a request for communication session from a first user device to communicate with a second device. The request for the communication session can be notified to the service. The service can in turn notify the second device. As an example, the notification can comprise a variety of indicators associated with the first user device requesting the communication session, such as user device identities, locations, device capabilities, etc. As another example, the notification can be in form of a popup dialog, overlay, email, text, or the like on the second user device. Examples of a communication session request can be a voice call, a video call, video conferencing, streaming multimedia distribution, instant messaging, presence information, file transfer, fax over IP, online games, etc. For example, when the computing device 104 receives a request for a communication session, the computing device 104 can publish a communication request via a publication message (e.g., SIP PUBLISH message). The message can be sent to the service 120. The service 120 can notify the user device 102 the communication session. In another aspect, the service 120 can be configured to notify the user device 102 through a popup dialog, overlay, email, text, or the like.

At step 206, the user device can register with a communication processing system to receive the request for the communication session. In an aspect, the registration can use a messaging protocol that includes one or more of various session control protocols for communication, for example, session initiation protocol (SIP), media gateway control protocol (MGCP), real-time transport protocol (RTP), session description protocol (SDP), inter-asterisk exchange (IAX), jingle XMPP VoIP extensions, one or more of the of protocols of the H.323 standard, or the like. The communication processing system 124 can be, for example, a server (a proxy server, a communication management server, an application server, etc.), a gateway node (a session border controller (SBC), a media gateway control function ((MGCF), etc.), or a data management unit (e.g., an intelligent routing database (IRDB)). For example, the user device 102 can send a SIP registration request to the communication processing system 124, and the communication processing system 124 can send the registration request to the computing device 104. The SIP proxy server 126 of the computing device 104 can accept registration request from user device 102 and create a dynamic record of the contact information of the user device 102. The contact information can be the device identifier 108 and/or address identifier 110 associated with the user device 102. The computing device 104 can send SIP INVITE to the user device 102 according to its device identifier 108 and/or address identifier 110. The contact address can be stored in database 114 of the computing device 104. In an aspect, proxy server(s) 126 can provide a link between the communication session requestor and the location data stored in the database 114 so that proxy server(s) 126 can relay the SIP INVITE to the correct user device.

At step 208, the communication session with the computing device can be established via the communication processing system. For example, the communication session can be established between the computing device 104 and the registered user device 102. The user device 102 can engage in a communication session with the computing device 104 by accepting SIP INVITE. In another aspect, the computing device 104 can terminate a communication session in the event that user device 102 does not respond to SIP INVITE. It should be noted that the example discussed utilize SIP exchanges, other type of messages and/or techniques to register device can be used. In an aspect, when the communication session ends, the user device 102 can tear down the connection with the communication processing system 124 and computing device 104, thereby freeing up the resources on the communication processing system 124 and computing device 104.

In an aspect, the service can comprise a web service. The communication processing system can comprise one or more communication protocol servers. The communication processing system can comprise a telephone communication processing system. Establishing a persistent connection with a service can comprise providing login credentials to the service.

In an aspect, the service can be subscribed to a presence system. The service can receive the notification via the presence system. Registering with a communication processing system to receive the request for the communication session can comprise registering with the communication processing system by session initiation protocol (SIP). The communication session can comprise one or more of: internet telephone calls, multimedia distribution, multimedia conferences, and presentations.

Figure 3:
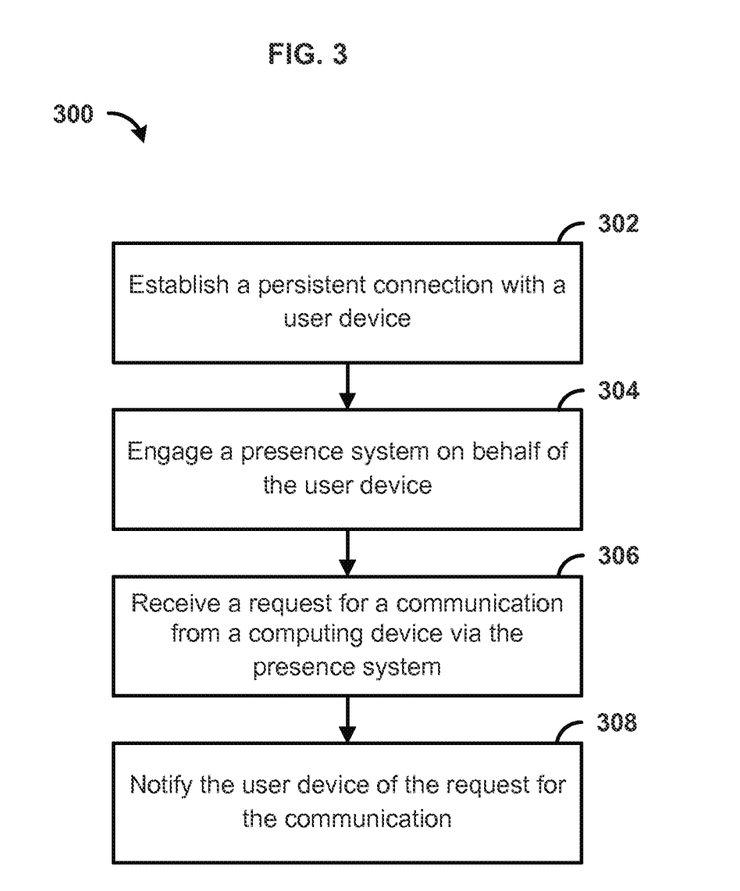
FIG. 3 is a flowchart illustrating another example method.

FIG. 3 is another flow chart illustrating an example method 300 for dynamic connection management. At step 302, a persistent connection with a user device can be established. For example, the user device 102 can log in to a service 120 by presenting an authentication credential. In an aspect, the persistent connection can be a predefined time (e.g. X number of minutes or hours). As a further example, the persistent connection can comprise an expiration date or a time range (e.g., X number of hours or days). In another aspect, the service 120 can accept a login credential and thereby establish a persistent user device-service connection. The connection can enable the service 120 to act as the agent to look for the present event for user device 102. A service can be a web service, for example, a web application located and invoked across the web. A service can interact with other applications or another service. The service can communicate with the user device 102 synchronously or asynchronously over standard Internet protocols, such as hypertext transfer protocol (HTTP), simple object access protocol (SOAP), universal description, discovery and integration (UDDI), etc. As a specific example, the web service can be a Comet service. As another example, the service can be Google cloud messaging service, Cloud 2 device messaging service, Apple push notification service, and the like. As such, a respective presence system for the Google cloud messaging service, Cloud 2 device messaging service, or Apple push notification service can be used for notifying the respective service for a request for a communication session.

At step 304, the service 120 can engage (e.g., subscribe to) presence system 122 on behalf of logged in user device 102. As an example, the presence system 122 can accept, store, and distribute a present event to its engager (e.g., subscribers), for instance, the service 120. A subscription can refer to a manner in which the presence system 122 can establish its interest in obtaining notification messages relating to particular present events. In an aspect, such events can relate to information associated with the request for communication session for the user device 102. In another aspect, the presence system 122 can be implemented as a server or have an internal structure involving a plurality of servers and proxies. The subscription allows the presence system 122 to establish its interest in obtaining notification messages relating to particular events, for example, communication request for the logged in user device. The presence system 122 can accept, store, and distribute a present event to the service 120. When the presence system 122 receives a present event, it can notify the service 120. In an aspect, the present event can be an incoming communication request.

At step 306, a request for a communication session from a computing device can be received via the presence system. For example, the service 120 can receive the request for a communication session from the presence system 122, wherein the presence system 122 can receive a request for a communication session from a computing device 104. For example, when the computing device 104 receives a communication session request from a user device, the computing device 104 can publish a communication request via a publication message. The publication message (e.g., SIP PUBLISH message) can be sent from the computing device 104 to the presence system 122.

At step 308, the user device can be notified of the request for the communication session. For example, the service 120 can notify the user device 102 of the present event (e.g., request for a communication session). For example, the present event can refer to an incoming communication session request from other user devices over network 105 to communication with the user device 102. As another example, the notification can comprise a variety of indicators associated with the user device 102, such as user device identities, locations, device capabilities, etc. As another example, the user device 102 can be notified through a popup dialog, overlay, email, text, or the like.

In an aspect, engaging a presence system on behalf of the user device can comprise subscribing to the presence system on behalf of the user device. The communication processing system can comprise a telephone communication processing system. Establishing a persistent connection with the user device can comprise receiving login credentials from the user device. The communication processing system can comprise one or more communication protocol servers. The communication session can comprise one or more of: internet telephone calls, multimedia distribution, multimedia conferences, and presentations.

Figure 4:
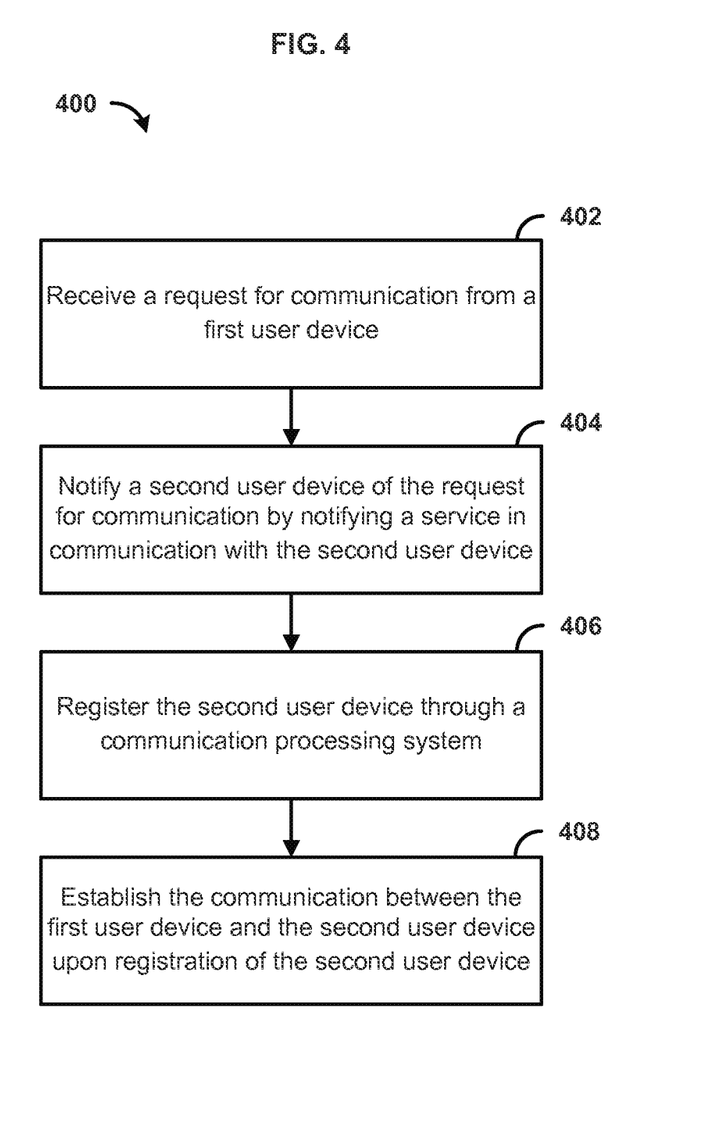
FIG. 4 is a flowchart illustrating another example method.

FIG. 4 is another flow chart illustrating an example method 400 for dynamic connection management. At step 402, a request for a communication session can be received from a first user device. For example, when the computing device 104 receives a communication session request from the first user device, the computing device 104 can publish a communication request via a publication message. The publication message (e.g., SIP PUBLISH message) can be sent from the computing device 104 to the presence system 122. The first user device can be an electronic device capable of communicating with the computing device 104. As an example, the first user device can be a computer, a telephone, a VoIP phone, a smartphone, a laptop, a tablet, a mobile device, or other device capable of communicating with the computing device 104.

At step 404, a second user device can be notified of the request for a communication by notifying a service (e.g., web service) in communication with the second user device. For example, the service 120 can receive the request for a communication session from the presence system 122 and notify the request to the second user device. As an example, the notification can comprise a variety of indicators associated with the first user device, such as user device identities, locations, device capabilities, etc. As another example, the second user device can be notified through a popup dialog, overlay, email, text, or the like. In an aspect, a service can be a web service, for example, a web application located and invoked across the web. A service can interact with other applications or another service. The service can communicate with the user device 102 synchronously or asynchronously over standard Internet protocols, such as hypertext transfer protocol (HTTP), simple object access protocol (SOAP), universal description, discovery and integration (UDDI), etc. As a specific example, the service can be a Comet service. As an example, the second user device can be a computer, a telephone, a VoIP phone, a smartphone, a laptop, a tablet, a mobile device or the like. In another aspect, the present system 122 can accept, store, and distribute a present event to the service 120. In another aspect, the presence system 122 can be implemented as a server or have an internal structure involving a plurality of servers and proxies.

At step 406, the second user device can be registered through a communication processing system. In an aspect, the registration can use a messaging protocol that includes one or more of various session control protocols for communication, for example, session initiation protocol (SIP), media gateway control protocol (MGCP), real-time transport protocol (RIP), session description protocol (SDP), inter-asterisk exchange (IAX), jingle XMPP VoIP extensions, one or more of the of protocols of the H.323 standard, or the like. For example, the second user device 102 can send a SIP registration request to the communication processing system 124, and the communication processing system 124 can send the registration request to the computing device 104. The SIP proxy server 126 of the computing device 104 can accept registration request from user device 102 and create a dynamic record of the contact information of the user device 102. The contact information can be the device identifier 108 and/or address identifier 110 associated with the user device 102. The computing device 104 can send SIP INVITE to the user device 102 according to its device identifier 108 and/or address identifier 110. The contact address can be stored in database 114 of the computing device 104. In an aspect, proxy server(s) 126 can provide a link between the first user device and the location information of the second user device stored in the database 114 so that proxy server(s) 126 can relay the SIP INVITE to the correct user device. The communication processing system 124 can be, for example, a server (a proxy server, a communication management server, an application server, etc.), a gateway node (a session border controller (SBC), a media gateway control function ((MGCF), etc.), or a data management unit (e.g., an intelligent routing database (IRDB)).

At step 408, the communication session between the first user device and the second user device can be established upon registration of the second user device. For example, the second user device can accept the SIP INVITE from the computing device 104, and thus establish the communication session with the first user device. In another aspect, the communication session can be terminated by the computing device 104 in the event that user device does not respond to SIP INVITE. In an aspect, when the communication session ends, the second user device can tear down the connection with the communication processing system 124 and computing device 104, thereby freeing up the resources on the communication processing system 124 and computing device 104.

In an aspect, the communication processing system can comprise a telephone communication processing system. The communication processing system can comprise one or more communication protocol servers. Registration of the second user device comprise the use of SIP. The service can be subscribed to a presence system. Notifying a service can comprise notifying the presence system to which the service is subscribed. The service can comprise a persistent connection to the second user device.

Figure 5:
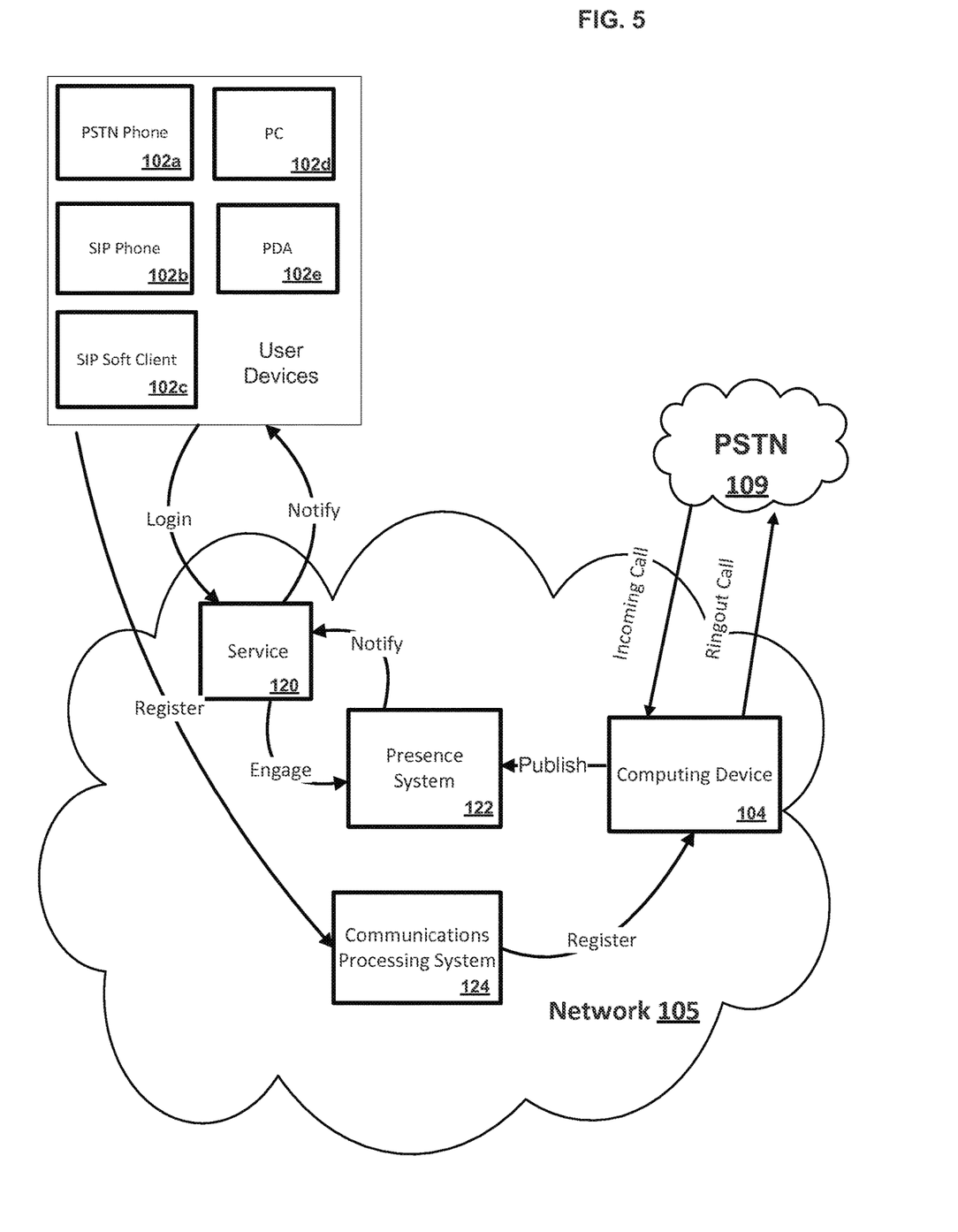
FIG. 5 is a block diagram of an exemplary system in which the present methods can operate.

FIG. 5 is a block diagram illustrating an example dynamic connection management system according to one or more aspects of the present disclosure. As an example, in a telephone communication system, user devices, such as IP phones and other SIP clients, can register with a communication processing system, as registration allows the location of a client to be known when it is required to receive an incoming call. The "location" can be identified as an IP address and port number of the user device. On most IP phones, the IP address can change, e.g., from day to day. For mobile devices, the IP address can change, for example, minute by minute by moving from service carrier to Wi-Fi and back again. For an IP phone to receive calls, the IP phone can register its location with the database 114 of the computing device 104. In an aspect, the registration process can be initiated as soon as the phone is switched on. In one aspect, the disclosed methods and systems can enable IP phones to register only when there is an incoming call. As an example, a plurality of user devices 102*a, b, c, d, e* are shown connected to a network 105 in FIG. 5. Although illustrated in a cluster, devices 102 can be mobile or stationary, and located throughout a network. The user devices can be IP phones, PSTN phones, SIP soft clients, residential voice gateways, other IP clients, such as Skype, MSM Messenger, office communicator, PDAs, VoIP enabled personal computers or a VoIP adapter (e.g., an analog telephone adapter (ATA)), and the like. In an aspect, a user device can be connected to a network address translation (NAT) or asymmetric digital subscriber line (ADSL) modem for a unique IP address on a public or private network. For a PSTN phone, an ATA is needed between the phone and the NAT or ADSL modem.

The user device 102 can log into the service 120 by providing login credentials. The service can, in turn, engage (e.g., subscribe to) a presence system 122. The computing device 104 can receive a communication session request from another public or private network, for example, a public switched telephone network (PSTN) as shown in FIG. 5. The presence system 122 can be configured to receive messages from the computing device 104. When the computing device 104 receives a communication session request, the computing device 104 can publish the request and related data (e.g. user device IP address, user device login credential, user device identification number) to the presence system 122. The presence system 122 can then notify the service 120 of the communication session request. The service 120 can check which of registered user devices 102a,b,c,d,e the communication session request relates to and notify the respective user device. If the user device 102 determines to participate in the communication session, the user device 102 can register with the computing device 104.

In another aspect, the communication processing system 124 can be employed between the user device 102 and the computing device 104 for a variety of reasons. The communications processing system 124 can serve as an edge server between user device 102 and computing device 104 to register user device 102. For example, the communication processing system 124 can be configured for assistance in network address translation (NAT) traversal and various other functions as described herein.

A communication session can be establish d when the user device 102 is registered. After the communication session ends, registered user device 102 can tear down the registration with computing device 104 and the communications processing system 124, freeing up the their resources.

In another aspect, a notification involving user device 102 and service 120 can be performed as a polling request and response to the polling request. Specifically, user device 102 can execute a poll request to service 120. The service 120 can hold the request until a present event for user device 102 becomes available. When a present event for the user device is generated, the web service can respond to the polling request of the user device by pushing the present event to the user device. As an example, the present event can be an incoming call request.

Figure 6:
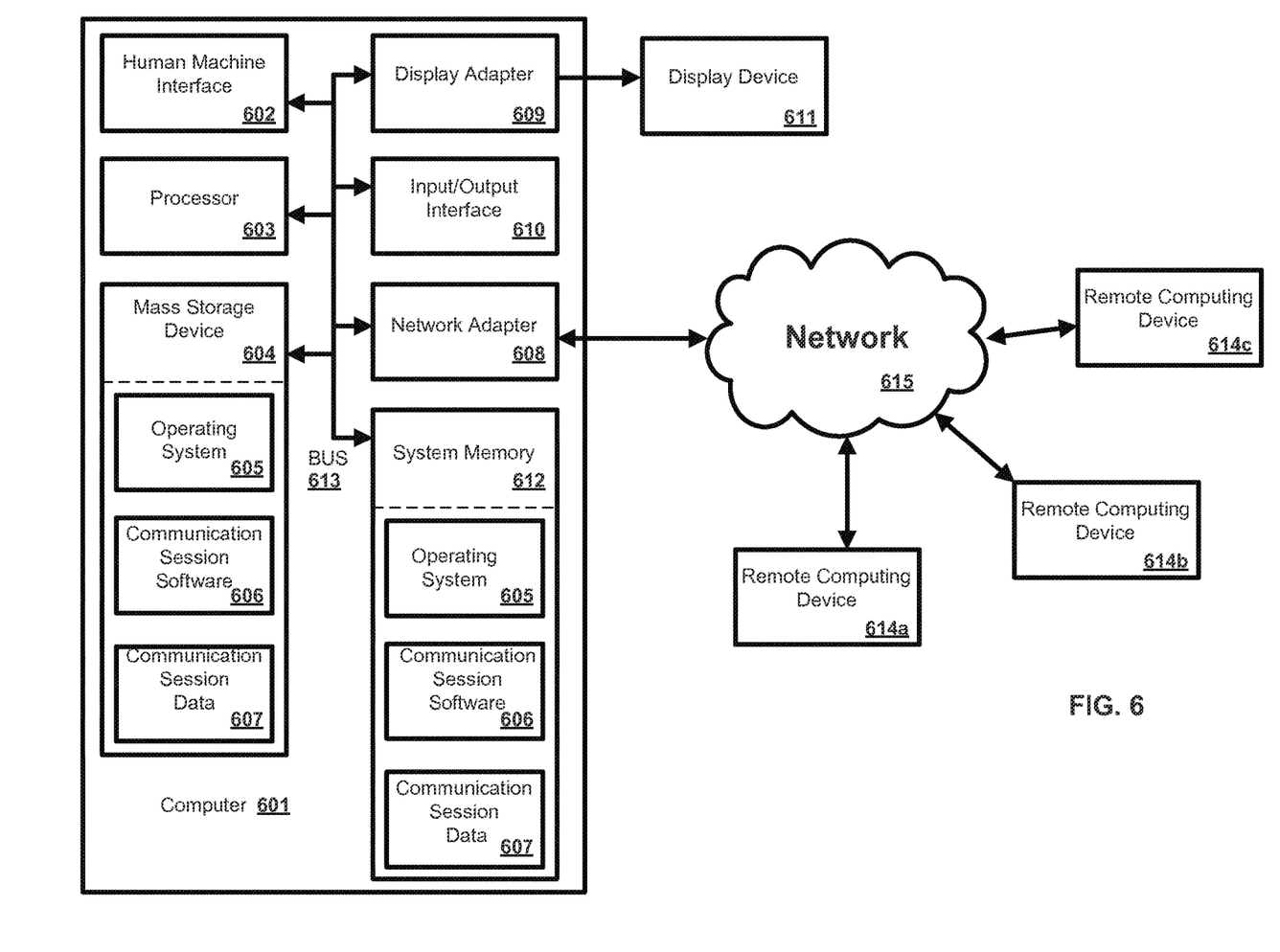
FIG. 6 is a block diagram illustrating an example computing device in which the present methods can operate.

FIG. 6 is a block diagram illustrating an exemplary operating environment for performing the disclosed methods. In an exemplary aspect, the methods and systems of the present disclosure can be implemented on computer 601 illustrated in FIG. 6 and described below. By way of example, user device 102 in FIG. 1 and FIG. 5 can be computer 601 as illustrated in FIG. 6. Similarly, the methods and systems disclosed can utilize one or more computing devices to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, communication session software 606, communication session data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data, such as communication session data 607, and/or program modules, such as operating system 605 and communication session software 606, that are immediately accessible to and/or are presently operated on by the processing unit 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards. CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and communication session software 606. Each of the operating system 605 and communication session software 606 (or some combination thereof) can comprise elements of the programming and the communication session software 606. Communication session data 607 can also be stored on the mass storage device 604. Communication session data 607 can be stored in any of one or more databases known in the art Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices, such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components, such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 605 are illustrated herein as discrete blocks, although it is recognized that such programs and components reside at various times in different storage components of the computing device 601, and are executed by the data processor(s) of the computer. An implementation of communication session software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, by a user device via a first communication session with a service, a notification of a request for a second communication session with a computing device, wherein the service is notified of the request via a presence system;
   registering, based on the notification, with a communication processing system, wherein registering with the communication processing system causes the request for the second communication session to be sent to the user device, wherein the communication processing system is separate from the presence system; and communicating, based on the request for the second communication session and via the communication processing system, with the computing device via the second communication session.

2. The method of claim 1, wherein the service comprises a web service.

3. The method of claim 1, wherein the communication processing system comprises one or more communication protocol servers.

4. The method of claim 1, wherein the communication processing system comprises a telephone communication processing system.

5. The method of claim 1, wherein registering with the communication processing system comprises sending, to the communication processing system, via a session initiation protocol (SIP), location information associated with the user device.

6. The method of claim 1, wherein the second communication session comprises one or more of: an internet telephone call, a multimedia distribution, a multimedia conference, or a presentation.

7. The method of claim 5, wherein the location information associated with the user device is received from a database.

8. The method of claim 5, further comprising sending, to a database, the location information associated with the user device for storage in the database.

9. The method of claim 1, wherein the request indicates a capability of the computing device, and wherein receiving the notification is based on the capability of the computing device corresponding to a capability of the user device.

10. The method of claim 1, wherein the communication processing system being separate from the presence system comprises at least one of the communication processing system having a physical location that is separate from the presence system or the communication processing system and the presence system are separate network entities.

11. A method comprising:
subscribing, on behalf of a user device, to a presence system;
receiving, based on subscribing to the presence system, a request for a first communication session with a computing device, wherein the presence system is configured to notify a service of the request, wherein the request indicates a capability of the computing device; and
sending, to the user device via a second communication session, based on the indicated capability of the computing device corresponding to a capability of the user device, a notification of the request for the first communication session, wherein the notification causes the user device to register with a communication processing system to receive the request for the first communication session, wherein the communication processing system is separate from the presence system.

12. The method of claim 11, wherein the computing device is configured to publish the request based on a session initiation protocol (SIP) PUBLISH message.

13. The method of claim 11, wherein the communication processing system comprises a telephone communication processing system.

14. The method of claim 11, wherein the communication processing system comprises one or more communication protocol servers.

15. The method of claim 11, wherein the second communication session comprises one or more of: an internet telephone call, a multimedia distribution, a multimedia conference, or a presentation.

16. The method of claim 11, wherein the communication processing system being separate from the presence system comprises at least one of the communication processing system having a physical location that is separate from the presence system or the communication processing system and the presence system are separate network entities.

17. A method comprising:
receiving, by a presence system, a request for a first communication session, wherein the request indicates a capability of a first user device;
sending, to a second user device, based on the indicated capability of the first user device corresponding to a capability of the second user device, a notification of the request for the first communication session, wherein sending the notification comprises notifying one or more subscribers of the presence system of the request, wherein the one or more subscribers comprise a service in communication with the second user device via a second communication session; and
causing, based on the second user device being registered with a communication processing system and a session initiation protocol (SIP), the second user device to receive the first communication session, wherein the communication processing system is separate from the presence system.

18. The method of claim 17, wherein the communication processing system comprises a telephone communication processing system.

19. The method of claim 17, wherein the communication processing system comprises one or more communication protocol servers.

20. The method of claim 17, wherein the second user device being registered to the communication processing system is based on location information associated with the second user device.

21. The method of claim 17, wherein the second user device is connected to the service, wherein the connection to the service is a persistent connection.

22. The method of claim 21, wherein the persistent connection corresponds to an expiration date or a time duration.

23. The method of claim 20, wherein the second user device being registered to the communication processing system is further based on receiving, from a database, the location information associated with the second user device.

24. The method of claim 17, wherein the communication processing system being separate from the presence system comprises at least one of the communication processing system having a physical location that is separate from the presence system or the communication processing system and the presence system are separate network entities.

* * * * *